United States Patent
Gipson

(10) Patent No.: US 12,231,789 B1
(45) Date of Patent: Feb. 18, 2025

(54) FIXED PATTERN CORRECTION FOR BAYER PATTERN IMAGER UNDER LOW LIGHT CONDITIONS

(71) Applicant: Volkswagen Aktiengesellschaft, Wolfsburg (DE)

(72) Inventor: Jerramy Lee Gipson, Willits, CA (US)

(73) Assignee: Volkswagen Aktiengesellschaft, Wolfsburg (DE)

( * ) Notice: Subject to any disclaimer, the term of this patent is extended or adjusted under 35 U.S.C. 154(b) by 64 days.

(21) Appl. No.: 18/458,643

(22) Filed: Aug. 30, 2023

(51) Int. Cl.
H04N 25/671 (2023.01)
H04N 23/76 (2023.01)

(52) U.S. Cl.
CPC ........... *H04N 25/671* (2023.01); *H04N 23/76* (2023.01)

(58) Field of Classification Search
CPC .............................. H04N 25/671; H04N 23/76
See application file for complete search history.

(56) References Cited

U.S. PATENT DOCUMENTS

| | | | |
|---|---|---|---|
| 6,914,627 B1 | 7/2005 | Dong | |
| 8,310,567 B2 | 11/2012 | Kim et al. | |
| 2005/0068439 A1* | 3/2005 | Kozlowski | H04N 25/677 348/E5.079 |
| 2006/0104417 A1* | 5/2006 | Kameshima | H04N 25/30 250/214 AG |
| 2008/0259195 A1* | 10/2008 | Yoshida | H04N 25/671 348/308 |
| 2009/0101798 A1* | 4/2009 | Yadid-Pecht | H04N 25/531 250/214 A |
| 2010/0309356 A1* | 12/2010 | Ihara | H04N 25/78 348/300 |
| 2011/0164146 A1* | 7/2011 | Chiang | H04N 23/72 348/E5.037 |
| 2015/0070570 A1* | 3/2015 | Tajbakhsh | H04N 23/88 348/362 |
| 2021/0227156 A1* | 7/2021 | Melamud | H04N 5/33 |
| 2023/0081593 A1* | 3/2023 | Caulfield | H04N 25/587 250/342 |

FOREIGN PATENT DOCUMENTS

EP 1018260 A1 7/2000

* cited by examiner

Primary Examiner — Michael Lee
(74) Attorney, Agent, or Firm — Peter Zura; LOZA & LOZA, LLP

(57) ABSTRACT

Technologies and techniques for dynamic fixed pattern correction for an image sensor. A current image and a previous image received in the image sensor is stored and a bias and gain is computed for the current image, wherein the computing includes processing the current image together with a current local average value, the previous image, and a previous local average value. A gain correction value and a bias correction value is generated based on the computing, and the gain correction value and bias correction value are combined with the current image to generate a corrected image. A Bayer image is generated, based on the generated corrected image.

20 Claims, 4 Drawing Sheets

FIXED PATTERN CORRECTION FOR BAYER PATTERN IMAGER UNDER LOW LIGHT CONDITIONS

TECHNICAL FIELD

The present disclosure relates to vehicle image and/or sensor control and processing. More specifically, the present disclosure is directed to controlling vehicle cameras and/or sensors based on frame-to-frame image variations.

BACKGROUND

When a color digital camera is used in low light conditions, exposure time can be increased only so much before the frame rate must be reduced. Once exposure has been increased to the point of maximum acceptable frame period, the analog gain of the image sensor must be increased in order to produce a usable image. However, this results in a grainy image, where sensor noise is visible as high frequency intensity variations in what might otherwise be a very uniformly colored surface. Ultimately, the usability of the sensor under low light conditions is limited by the sensor noise, and further increases to the analog gain does not provide more usable information, though the image is brighter.

Part of this noise is temporally random, caused by shot noise and other instantaneous effects such as thermal noise. The other part of the noise is persistent per pixel, caused by manufacturing variability, and is repeated frame to frame. This is referred to as Fixed Pattern Noise. Fixed Pattern Noise is particularly troublesome to motion detection, since the noise pattern follows the camera body rather than the external scene, and averaging over multiple frames does not reduce it.

To further complicate the issue of Fixed Pattern Noise, the behavior does not stay consistent over long timeframes, particularly as the image sensor changes temperature. It is generally understood that Fixed Pattern Noise is due to pixel-to-pixel variations in their near-linear response to light levels, which can be closely modeled as offsets to the expected bias and gain of each individual pixel. However, these offsets shift, as the image sensor changes temperature. They also do not behave identically in response to changes in analog gain and exposure time. If Fixed Pattern Noise is not corrected for and removed or reduced, then essentially the theoretical dynamic range of the image sensing system is reduced, since the Fixed Pattern Noise and random noise cannot be separated from each other.

Low light cameras, such as near infra-red (NIR), short-wave infra-red (SWIR), and far infra-red (FIR) or thermal cameras, often employ look-up tables, where each pixel's bias and gain offsets are determined in the factory, or by some calibration process. Generally, a uniform intensity target surface is sampled in several known lighting conditions, in order to determine each pixel's typical response. However, there are limitations to this method, since real-world values are also influenced by temperature, exposure time, and analog gain. Correction tables including terms for these factors as well, would improve the performance even more-so, but pre-determining the per-pixel response under all combinations of these conditions is impractical during factory assembly.

Some FIR cameras, employ a paddle heated to a controlled temperature, which from time to time is rotated to cover the camera's view, the results of which are used to adjust the sensor's look-up tables. Other solutions include dead-pixel maps, where particularly troublesome pixels are filled in with values from neighboring pixels, and utilizing various blur methods, which reduce the impact of both temporal and fixed pattern noise, at the expense of fine detail in the image.

Some dynamic "shutter-less" methods of Fixed Pattern Correction have also been demonstrated by producers of low-light cameras (particularly for FIR cameras), where the image sensor responds over time to environmental changes. These methods are highly proprietary to the producer of the image sensor, and their exact methods are not disclosed.

Dead-pixel maps, in effect throw away information, and substitute neighboring data in its place. Blur methods do not increase the amount of usable information, but rather make the unusable information less noticeable, at the expense of obscuring some amount of usable information.

SUMMARY

Various apparatus, systems and methods are disclosed herein relating to enhancing machine vision for autonomous driving or driver assistance based on road lighting conditions. Unlike look-up tables determined in the factory or at initialization, aspects of the present disclosure dynamically respond to changes in a sensor's operating environment (such as voltage and temperature) that would be prohibitive to determine during calibration. In such conventional configurations, the use of a uniformly illuminated or heated paddle may result in time periods where a sensor is blocked, and thus cannot provide information about a sensor's surroundings. Such conventional configurations may also result in degraded performance over time.

In some illustrative embodiments, a bias and gain of each pixel is adjusted before Bayer processing is performed, wherein the bias and gain may be based on variations from nearby pixels of the same Bayer color, on a presumption of an average uniform local region. Adjustments may be performed incrementally over time, and decay towards a default to account for changes in a scene, as well as a sensor's response to temperature or changes in analog gain or exposure time.

In some examples, a method is disclosed for dynamic fixed pattern correction for an image sensor, comprising: storing a current image and a previous image received in the image sensor; computing a bias and gain for the current image, wherein the computing comprises processing the current image together with a current local average value, the previous image, and a previous local average value; generating a gain correction value and a bias correction value based on the computing; combining the gain correction value and bias correction value with the current image to generate a corrected image; and generating a Bayer image, based on the generated corrected image.

In some examples, an image processing system for dynamic fixed pattern correction is disclosed, comprising: an image sensor; a memory for storing a current image and a previous image received in the image sensor; a processing apparatus, operatively coupled to the memory and the image sensor, wherein the processing apparatus is configured to compute a bias and gain for the current image, wherein the computing comprises processing the current image together with a current local average value, the previous image, and a previous local average value, generate a gain correction value and a bias correction value based on the computing, combine the gain correction value and bias correction value with the current image to generate a corrected image, and generate a Bayer image, based on the generated corrected image.

In some examples, a method is disclosed for dynamic fixed pattern correction for a vehicle image sensor, comprising: storing a current image and a previous image received in the vehicle image sensor; computing a bias and gain for the current image, wherein the computing comprises processing the current image together with a current local average value, the previous image, and a previous local average value; generating a gain correction value and a bias correction value based on the computing; combining the gain correction value and bias correction value with the current image to generate a corrected image; and generating a Bayer image, based on the generated corrected image.

BRIEF DESCRIPTION OF THE FIGURES

The present invention is illustrated by way of example and not limitation in the figures of the accompanying drawings, in which like references indicate similar elements and in which.

DETAILED DESCRIPTION

Figure 1:
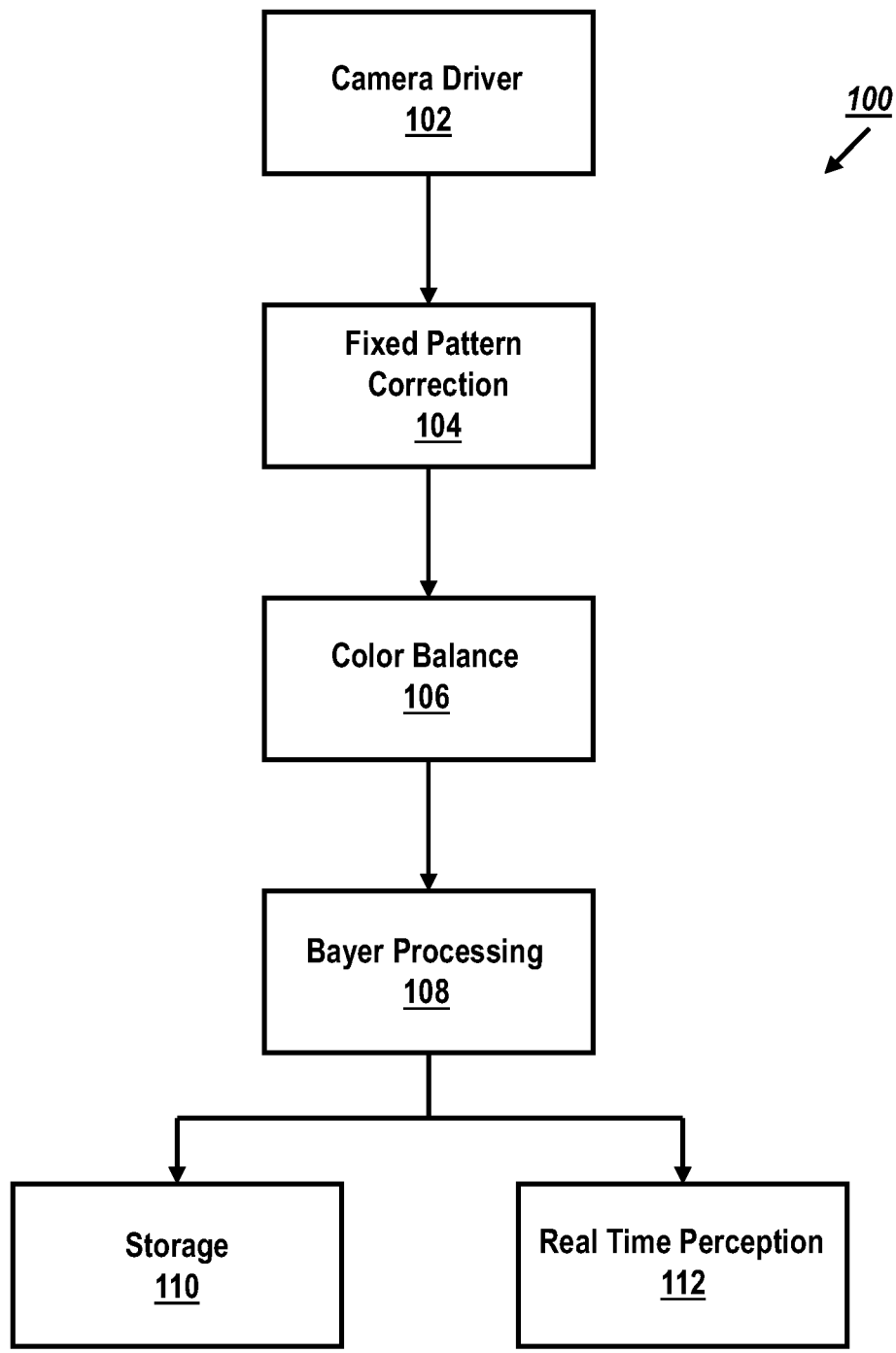
FIG. 1 illustrates a processing system for processing a Bayer image under some aspects of the present disclosure.

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates an image processing system 100 for processing a Bayer image under some aspects of the present disclosure. Turning to FIG. 1, a camera driver 102 of the system 100 receives a raw image, and transmits the image to fixed pattern correction circuit 104. The camera driver 102 may be configured as part of a camera or image sensor system, which is generally known in the art, and is not explicitly illustrated in the figure for the purposes of brevity. The image sensor system 100 would typically include other components, such as one or more lenses, shutters, image sensor, image signal processor (ISP), analog-to-digital converter (ADC) digital signal processor (DSP) and memory, among others.

An image sensor would be configured to convert light into electrical signals. In some examples, the image sensors may be configured as Charge-Coupled Devices (CCDs) and Complementary Metal-Oxide-Semiconductor (CMOS) sensors. The ISP may be configured as a specialized chip or circuitry that processes the raw electrical signals from the image sensor, and may further perform tasks such as noise reduction, color correction, white balance adjustment, and image compression, among others. The ISP may further enhance image quality and prepare the image data for further processing or storage. The DSP of the image sensor system of FIG. 1 may be configured to perform advanced image processing tasks, such as image enhancement, noise reduction, sharpening, and applying various filters. It can also perform complex algorithms for features like autofocus, face detection, and image stabilization.

In the example of FIG. 1, the raw image data from camera driver 102 is subjected to fixed pattern correction in block 104, discussed in greater detail below. In block 106, color balancing (also known as white balance adjustment) would generally be applied to the fixed pattern corrected image to configure the image to a desired characteristic (e.g., ensure a more natural appearing lighting for the image). In block 108, Bayer processing would be applied to merge individual Bayer pattern channels into a standard RGB image. After the Bayer processing (108), the image could be stored 110 and/or used in real-time perception 112, such as the kind used in real-time systems (e.g., machine perception, stereoscopic depth estimation, etc.).

In some examples, an image sensor's pixel is presumed to have a near linear response to the level of light it receives, with the exception of when a pixel saturates at its lowest or highest output value. As a practical matter however, there may be variations in the linear relationship from pixel to pixel, which may be expressed in terms of a bias and gain. These terms, considered per pixel, are generally constant, or change slowly.

Figure 2:
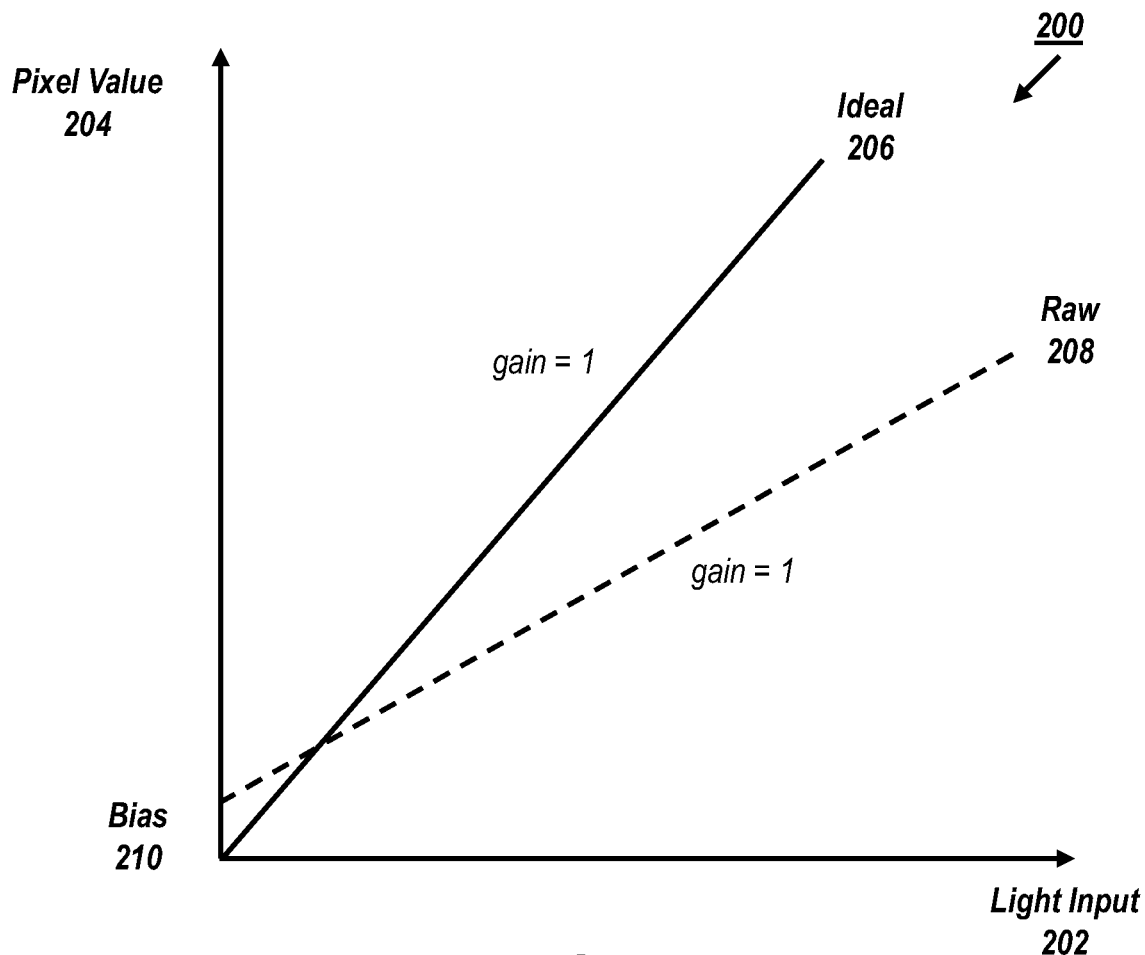
FIG. 2 illustrates a simulated response graph for a raw pixel sensor and an ideal pixel sensor according to some aspects of the present disclosure.

FIG. 2 illustrates a simulated response graph 200 for a raw pixel sensor 208 and an ideal pixel sensor 206 according to some aspects of the present disclosure. This example illustrates how a pixel's raw output (208) differs from its ideal output (206), due to bias 210 and gain differing from ideal values, based on pixel value 204 versus light input 202. Given this response, corrections can be made to the pixel's output via correction values, to achieve a more ideal value. In some examples, corrections may be expressed by the following formula, where P is the raw value produced by the pixel, gain and bias are determined values (near 1.0 and 0 respectively), and P' represents the resulting more ideal value:

$$P' = P*\text{Gain} + \text{Bias}.$$

Conversely, the raw output value may be expressed as related to the ideal value, by the formula:

$$P = (P' - \text{Bias})/\text{Gain}$$

When an image sensor utilizes a Bayer pattern filter, pixels of different color channels will have greatly differing responses to the same light input, depending on the wavelengths contained in the light. However, it is expected that pixels at the Bayer pattern stride (arrangement of the pixels in the Bayer pattern), which constitute pixels all belonging to the same color channel, should all have identical responses for a light input of a particular mixture of wavelengths. Thus, if it is presumed that a local region in an image will be of uniform color (such as for a flat painted surface), then it is expected that for a given center pixel, nearby pixels at the Bayer pattern stride offset will have similar outputs.

Figure 3:
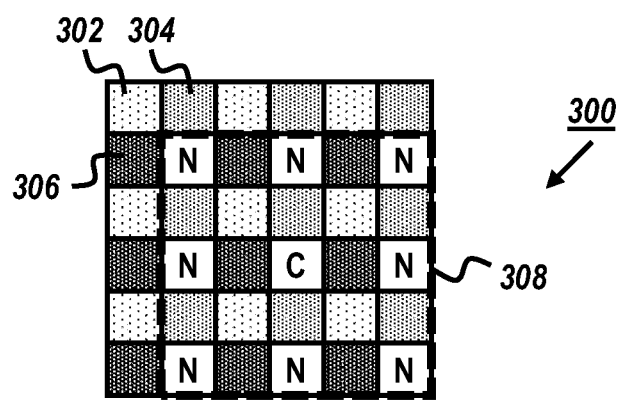
FIG. 3 illustrates a Bayer pattern including a center pixel for a region, and similar neighbor pixels from the same Bayer channel under some aspects of the present disclosure.

FIG. 3 illustrates a Bayer pattern including a center pixel for a region, and similar neighbor pixels from the same Bayer channel under some aspects of the present disclosure. In this example a Bayer pattern is shown, where the "center" pixel for a region 308 is marked as C, and similar neighbor pixels from the same Bayer channel are marked as N. In this case, a 2×2 Bayer pattern is shown, though the same concept applies to Bayer patterns with different strides, such as 3×3 or 4×4.

The Bayer pattern may be arranged in a repeating grid (e.g., 2×2), where each group of four pixels consists of one red (302), one blue (304), and two green (306) filters. This arrangement is based on the fact that the human visual system is more sensitive to green light. When capturing an image with a Bayer pattern sensor, each pixel only captures intensity information for one color channel (red, green, or blue). To obtain full-color information, the missing color values need to be interpolated or estimated based on neighboring pixels. The Bayer pattern stride defines the distance between neighboring pixels of the same color channel in a row or column. The stride can vary, depending on the specific image sensor design and manufacturer.

For example, a Bayer pattern stride of 2 means that neighboring pixels of the same color channel are placed two pixels apart in a row or column. In other words, there are two green pixels between two red or blue pixels. A Bayer pattern stride of 1 indicates that neighboring pixels of the same color channel are adjacent to each other. The Bayer pattern stride is an important consideration when processing raw Bayer data from an image sensor, because it may affect the interpolation algorithms used to reconstruct full-color information from the captured data. Different strides may require different interpolation techniques to achieve accurate and visually pleasing color reproduction in the final image.

In the example of FIG. 3, a local average may be naively determined by using an unweighted average of neighbor pixels (N), and it can be expected that the center pixel (C) should typically have about the same value as this local average, considered over the variety of scenes that will be sampled by the image sensor. However, a less naive method of computing the Local Average will be covered later, which produces improved results.

For a single image, it is expected that there will be some difference between a center pixel (C) and the local average determined from its neighbors, due to real variations in the sampled scene. However, when considered statistically over many random scenes, it is expected that this difference should diminish towards zero. Any persistent difference between a pixel and its neighbors from the same channel, will be due to inaccurate bias and gain values used for the pixel.

For processing a single image frame, it may be ambiguous whether a difference between a pixel and its local average is due to incorrect gain or bias for the pixel, since a desired value could be achieved by either adding or multiplying by some value. However, by considering the behavior of the pixel and its local average from two sufficiently different image frames, taken near in time to each other, the gain and bias terms can be determined, utilizing two equations and two unknowns.

In some examples, the formula provided above relating a pixel's raw output value (P) to its ideal value, the local average (A) may be presumed to be an ideal value. For two frames (e.g., indexed 0 and 1), the following equations may be derived:

$$P1 = (A1 - \text{Bias})/\text{Gain}$$
$$P0 = (A0 - \text{Bias})/\text{Gain}.$$

From these, it can further be derived that:

$$\text{Gain} = (A1 - A0)/(P1 - P0)$$
$$\text{Bias} = (P1*A0 - P0*A1)/(P1 - P0).$$

This result may be meaningful if there is sufficient difference between P0 and P1. Considering examples where pixel values are quantized, and subject in non-repeating temporal sensor noise, these resulting values for gain and bias may be disregarded, if the difference between P0 and P1 is less than the typical temporal pixel noise, since the differences may be due only to random chance, and not a true change in scene.

It follows that the result should be disregarded if P0 is equal to P1, since then gain and bias would be determined to be infinite, as this would imply that, regardless of what the ideal value should be, the pixel's raw output is the same, which would lead to an unsolvable problem. A result would also be invalid and thus should be disregarded, in the event that P0 or P1 is saturated at either the highest or lowest possible value, since the pixel's response becomes non-linear at that point.

Successive determinations of gain and bias will typically vary, due to natural variations in a changing scene, as well as natural variations in a real offset between an ideal value of a pixel and its neighbors. Such variations may be expected, since in most cases, a completely uniform colored surface is rarely present, and there is random sensor noise present. However, obtaining usable values for pixel gain and bias can be determined statistically, by combining results taken over many frames. In some examples, a single determination of gain and bias may become more meaningful as the difference between two frames' local average become greater, since this implies a true change in scene, and not just random pixel fluctuation. A multi-frame accumulation of gain and bias can further be weighted by using the squared difference of the two frames' local average for a pixel. Thus, large changes in scene will have more influence than small changes in determining a cumulative bias and gain. Additionally, to accommodate slow changes in a pixel's true bias and gain over time (e.g., due to changes in temperature and other effects), the weighted sums are reduced at some decay rate, in order to diminish the influence of past data as time passes.

The following code implements the above-described technologies and techniques to adjust correction values for a single pixel, utilizing pixel values for a current frame and a recent previous frame. It should be understood by persons skilled in the art that the following code is merely one example, and that other code variations or structures are contemplated in the present disclosure.

p1 = current frame's pixel value p0 = previous frame's pixel value a1 = current frame's local average a0 = previous frame's local average MaxVal = maximum value representable by pixel depending on sensor. 0xFF or 0xFFF is typical.

NoiseLevel = typical maxmium pixel fluctuation between frames for a static scene (e.g., 5)

DecayRate = factor to reduce accumulations by a configured rate (e.g., 0.99)

m_weightSum = persistent accumulation of weight across a configured number frames (e.g., initalized to 100*100)

m_biasSum = persistent accumulation of bias across many frames (initialized to 0)

m_gain = resulting reported gain to be used for correction m_bias = resulting reported bias to be used for correction //pixel's bias and gain don't change in these cases if ((p1 == 0) || (p1 == MaxVal)) continue;

if ((p0 == 0) || (p0 == MaxVal)) continue;

-continued if (abs(p1 – p0) < NoiseLevel) continue;

float weight = (a1 – a0) * (a1 – a0);

float gain = (a1 – a0)/(p1 – p0);

float bias = (a0 * p1 – a1 * p0)/(p1 – p0);

m_weightSum = m_weightSum * DecayRate + 1 * weight;

m_gainSum = m_gainSum * DecayRate + gain * weight;

m_biasSum = m_baisSum * DecayRate + bias * weight;

m_bias = m_biasSum / m_weightSum;

m_gain = m_gainSum / m_weightSum;

If a naive approach to computing a local average is used, one or more issues may arise from taking the unweighted average of nearby pixels from the same channel as the pixel of interest. First, some pixels can be saturated, due to extreme light levels in the scene or single pixel defects (e.g., "stuck on"). When saturated, a pixel no longer has a linear response, and does not contribute well to statistical sampling. Additionally, nearby pixels with values differing greatly from the center pixel (either due to poor pixel behavior, or even natural variation in the scene) will cause incorrect biases and gains to be computed for their neighbors, which may appear as halos in the image around the pixel experiencing high deviations.

To counter these issues, when computing the local average, neighbor pixels which are saturated, are excluded from the average, neither contributing to the sum, nor adding to the count of used pixels. Additionally, the otherwise valid neighbor pixel which is most different in value from the center pixel is also excluded from the average. However, if too many neighbor pixels are excluded from the average, a good statistical sampling of the local region may not become available, which will result in poor results for determining gain and bias. In this case, the local average is discarded, and the center pixel's value is used instead. This results in a lessor change to the existing accumulated bias and gain for the pixel.

The following code implements the above-described methods for determining a local average for a single pixel:

IN_TYPE centerVal = m_currImage [y] [x];

IN_TYPE * neighbors[8];

neighbors[0] = &m_currImage [y – 2] [x – 2];

neighbors[1] = &m_currImage [y – 2] [x + 0];

neighbors[2] = &m_currImage [y – 2] [x + 2];

neighbors[3] = &m_currImage [y + 0] [z – 2];

neighbors[4] = &m_currImage [y + 0] [x + 2];

neighbors[5] = &m_currImage [y + 2] [x – 2];

neighbors[6] = &m_currImage [y + 2] [x + 0];

neighbors[7] = &m_currImage [y + 2] [x + 2];

int farthest = centerVal;

int count = 0;

float sum = 0;

```
-continued
for (int n = 0; n < 8;  ++n)
{IN_TYPE  & value = *neighbors[n];
if ((value == minVal) || (value == MaxVal)) continue;
if (abs(int(value) – centerVal) > abs (farthest – centerVal))
farthest = value;
sum += value;
count++;}
if (count < 4)
{m_currLocalAverage[y] [x] = centerVal;
continue;}
sum –= farthest;
count––;
m_currLocalAverage[y] [x] = sum/count;
```

Figure 4:
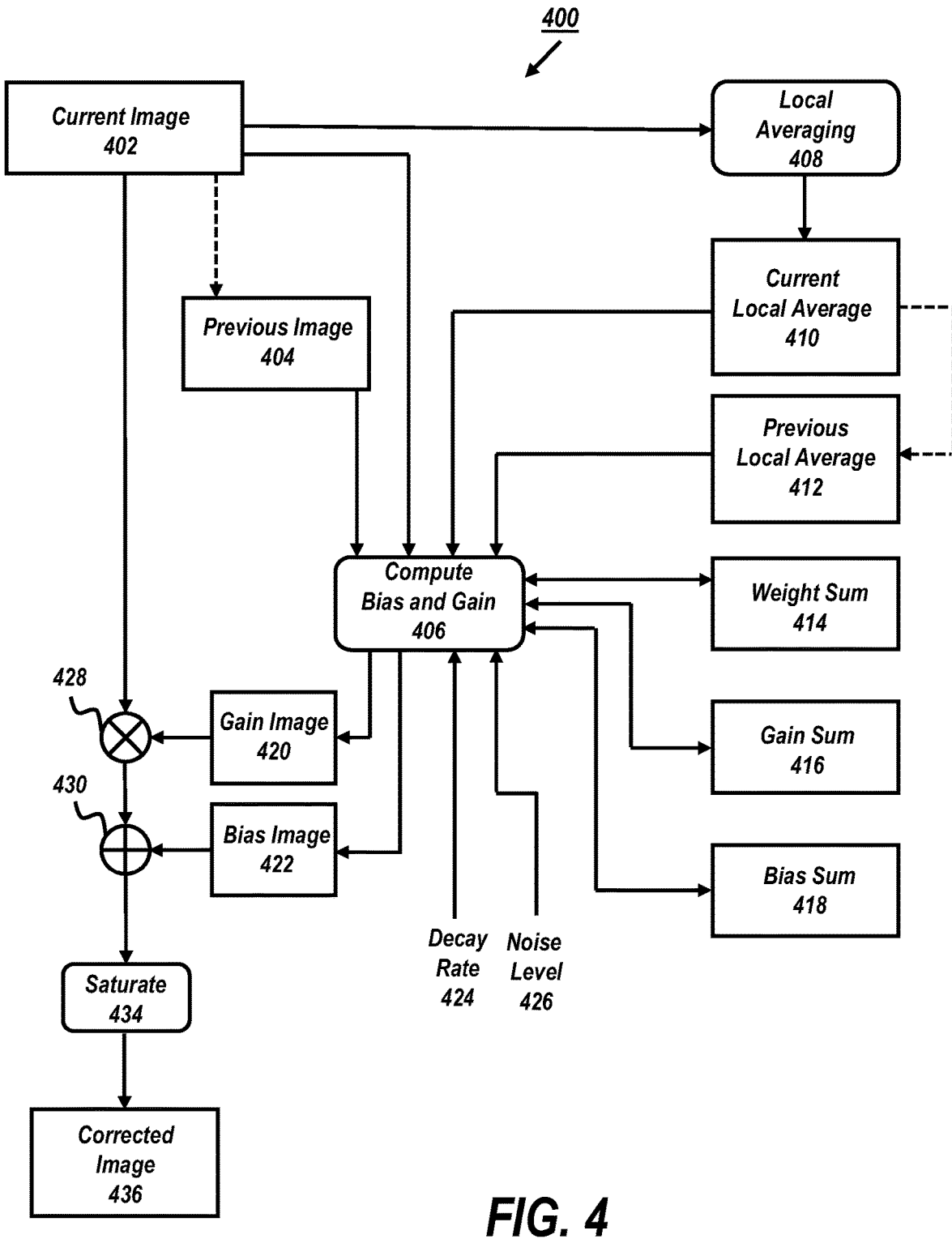
FIG. 4 illustrates a fixed pattern correction data flow, wherein bias and gain of pixels are adjusted before Bayer processing is performed, under some aspects of the present disclosure.

FIG. 4 illustrates a fixed pattern correction data flow, wherein bias and gain of pixels are adjusted before Bayer processing is performed, under some aspects of the present disclosure. In this example, the figure utilizes aspects of FIGS. 1-3 to implement fixed pattern correction using data structures that are passed among them and persist frame to frame. Rectangles in the figure (402, 410-418, 404, 420-422, 436) represent data arrays configured with the same dimensions as the input camera image, and may be configured to store floating point values, with the exception of current image 402 and corrected image 436. Rounded corner boxes (406, 408, 434) represent processing blocks (code), and unboxed references (424, 426) represent tunable constants.

Here, a new image frame is received as current image 402 (p1), and stored for subsequent processing as a previous image 404 (p0). The current image 402 is also subjected to local averaging, performed in block 408, to produce a current local average image 410 (a1). The current local average image 410 may also be stored for subsequent processing as a previous local average image 412 (a0). The bias and gain computational block 406 then receives the current image 402 and current local average image 410 as shown in the figure. Additionally, the bias and gain computational block 406 also receives the previous image 404 and previous local average image 412 as shown in the figure, where correction values are stored in gain image block 420 and bias image block 422. Additionally, image weight sum 414, gain sum 416 and bias sum 418 are processed by the bias and gain computational block 402 to accumulate a weighted average for the bias and gain. A decay rate 424 may be applied as a factor to reduce accumulations by a configured rate, and a noise level 426 may be applied to define typical maximum pixel fluctuation between frames for a static scene.

Once bias and gain images are produced, the current image 402 and current local average image 410, may be copied to storage for use as previous images (404, 412). The gain image 420 may then be combined (428) with the current image 402, then further combined 430 with bias image 422. In some examples, the image combinations (428, 430) may be combined using floating-point numbers used to represent color values and pixel intensities. Each color channel (e.g., red, green, and blue) may be represented by a floating-point value ranging from 0.0 to 1.0, where 0.0 represents the absence of that color and 1.0 represents its maximum intensity. When combining images, floating-point numbers are used to blend or merge pixels from different images together. The combined (428, 430) images may then be restricted in block 434 to the same fixed point range that was used by the input image, which may result in some pixels saturating, to produce a corrected image 436.

In some examples, since pixel bias and gain may change slowly, and may not be tied to a particular pixel value, the same bias and gain values may be used for multiple sequential input images, with comparable results. In such instances, local averaging (408) and bias and gain computation (406) may be separated into a second thread, and run at a lower rate, skipping some of the input images. This technique may be advantageous since that processing is more computationally intensive than simply applying bias and gain to a single image. Thusly, higher image sensor frame rates may be used, compared to configurations where all processing occurs in a single thread for each input image.

Aspects of the present disclosure may be applicable in configurations where an image sensor is used for the purpose of machine vision, and particularly for systems mounted to a self-driving car utilizing multiple cameras to provide stereo-vision depth information of the surroundings. Stereo-vision algorithms generally do poorly under low-light conditions, since they rely on pattern matching between overlapping images taken simultaneously by multiple cameras. As the level of camera noise increases relative to the usable information, there are increased instances of mis-matched patterns, resulting in incorrect depth measurements.

Figure 5:
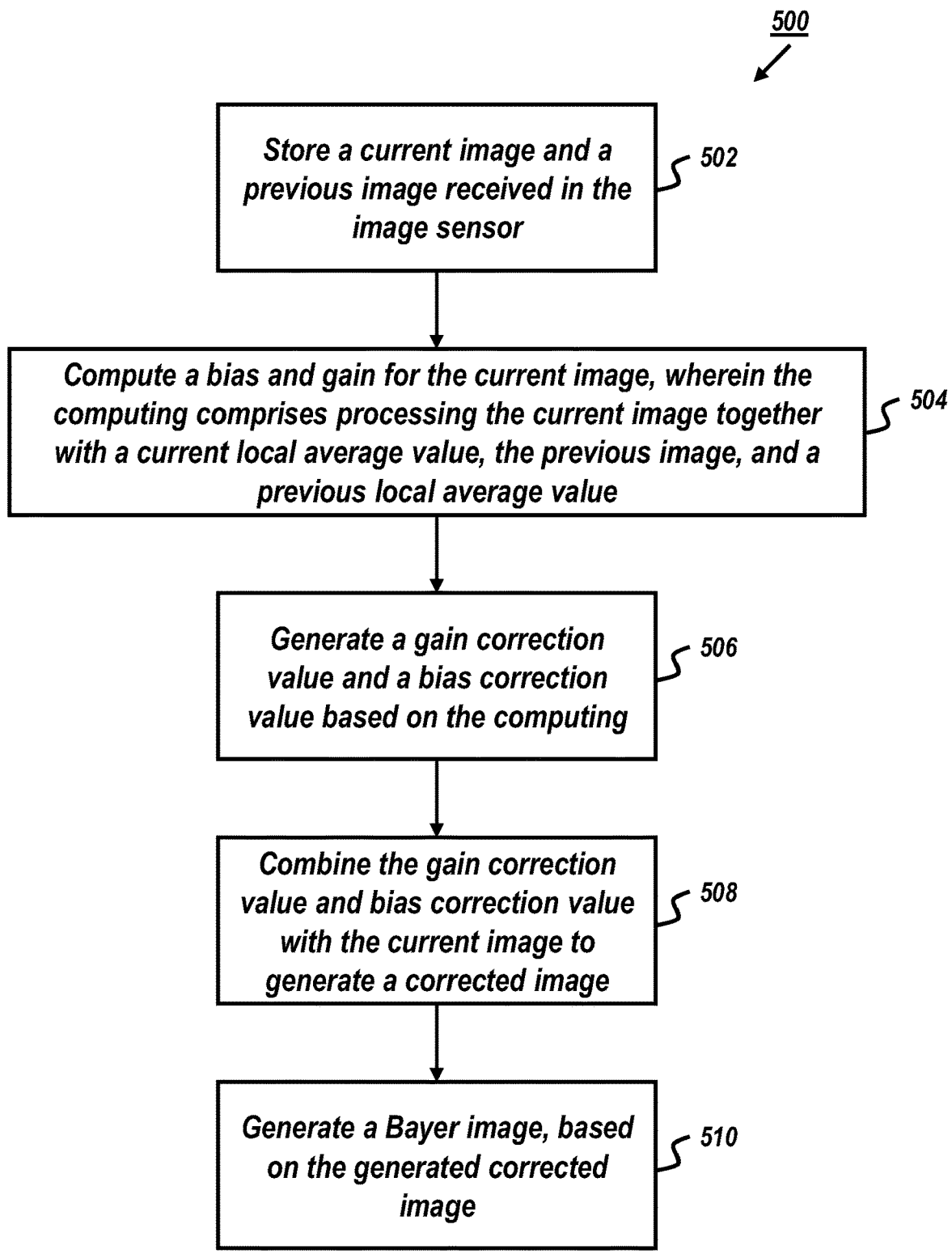
FIG. 5 illustrates a method for fixed pattern correction under some aspects of the present disclosure.

FIG. 5 illustrates a method 500 for fixed pattern correction under some aspects of the present disclosure. In this example, a memory apparatus may store a current image and a previous image received in the image sensor in block 502. For example, the current image may be image 402 and the previous image may be image 404 discussed above in connection with FIG. 4. In block 504 a processing apparatus may compute a bias and gain for the current image, wherein the computing comprises processing the current image (e.g., 402) together with a current local average value (e.g., 410), the previous image (e.g., 404), and a previous local average value (e.g., 412). The processing apparatus may be part of an image sensor system (100) discussed above in connection with FIG. 1, but may also be configured as a separate processing apparatus that is operatively coupled to the image sensor system.

In block 506, the processing apparatus may generate a gain correction value and a bias correction value based on the computing. In some examples, the gain correction value and the bias correction value may be processed in the bias and gain computational block 406, where generated correction values are stored in gain image block 420 and bias image block 422. In block 508, the processing apparatus may combine the gain correction value and bias correction value with the current image to generate a corrected image. In some examples, the gain correction value and bias correction value may be combined with the current image using a gain image (e.g., 420) may then be combined (e.g., 428) with a current image (e.g., 402), then further combined (e.g., 430) with a bias image (e.g., 422). In some examples, the image combinations (e.g., 428, 430) may be combined using floating-point numbers used to represent color values and pixel intensities. In block 510, the processing apparatus may generate a Bayer image, based on the generated corrected image (e.g., 436).

The following aspects are illustrative only and may be combined with other aspects or teachings described herein, without limitation.

Aspect 1 is a method for dynamic fixed pattern correction for an image sensor, comprising: storing a current image and a previous image received in the image sensor; computing a bias and gain for the current image, wherein the computing comprises processing the current image together with a current local average value, the previous image, and a previous local average value; generating a gain correction value and a bias correction value based on the computing; combining the gain correction value and bias correction value with the current image to generate a corrected image; and generating a Bayer image, based on the generated corrected image.

Aspect 2 may be combined with aspect 1 and includes that computing the bias and gain comprises computing and applying a weighted value using a squared difference between the current local average value and the previous local average value.

Aspect 3 may be combined with any of aspects 1 and/or 2, and includes that the weighted value comprises at least one of a decay rate and a noise level threshold.

Aspect 4 may be combined with any of aspects 1 through 3, and includes that computing the bias and gain comprises processing an image weight sum, a gain sum and a bias sum to accumulate a weighted average for the bias and gain.

Aspect 5 may be combined with any of aspects 1 through 4, and includes that combining the gain correction value and bias correction value with the current image comprises combining the gain correction value and bias correction value with the current image using floating-point numbers representing color values and pixel intensities.

Aspect 6 may be combined with any of aspects 1 through 5, and includes saturating the result of combining the gain correction values and bias correction values with the current image prior to generating the corrected image.

Aspect 7 may be combined with any of aspects 1 through 6, and includes that the image sensor comprises a vehicle image sensor.

Aspect 8 is an image processing system for dynamic fixed pattern correction, comprising: an image sensor; a memory for storing a current image and a previous image received in the image sensor; a processing apparatus, operatively coupled to the memory and the image sensor, wherein the processing apparatus is configured to compute a bias and gain for the current image, wherein the computing comprises processing the current image together with a current local average value, the previous image, and a previous local average value, generate a gain correction value and a bias correction value based on the computing, combine the gain correction value and bias correction value with the current image to generate a corrected image, and generate a Bayer image, based on the generated corrected image.

Aspect 9 may be combined with aspect 8 and includes that the processing apparatus is configured to compute the bias and gain by computing and applying a weighted value using a squared difference between the current local average value and the previous local average value.

Aspect 10 may be combined with any of aspects 8 and/or 9, and includes that the weighted value comprises at least one of a decay rate and a noise level threshold.

Aspect 11 may be combined with any of aspects 8 through 10, and includes that the processing apparatus is configured to compute the bias and gain by processing an image weight sum, a gain sum and a bias sum to accumulate a weighted average for the bias and gain.

Aspect 12 may be combined with any of aspects 8 through 11, and includes that the processing apparatus is configured to combine the gain correction value and bias correction value with the current image by combining the gain correction value and bias correction value with the current image using floating-point numbers representing color values and pixel intensities.

Aspect 13 may be combined with any of aspects 8 through 12, and includes that the processing apparatus is further configured to saturate the result of combining the gain correction values and bias correction values with the current image prior to generating the corrected image.

Aspect 14 may be combined with any of aspects 8 through 13, and includes that the image sensor comprises a vehicle image sensor.

Aspect 15 is a method for dynamic fixed pattern correction for a vehicle image sensor, comprising: storing a current image and a previous image received in the vehicle image sensor; computing a bias and gain for the current image, wherein the computing comprises processing the current image together with a current local average value, the previous image, and a previous local average value; generating a gain correction value and a bias correction value based on the computing; combining the gain correction value and bias correction value with the current image to generate a corrected image; and generating a Bayer image, based on the generated corrected image.

Aspect 16 may be combined with aspect 15 and includes that computing the bias and gain comprises computing and applying a weighted value using a squared difference between the current local average value and the previous local average value.

Aspect 17 may be combined with any of aspects 15 and/or 16, and includes that the weighted value comprises at least one of a decay rate and a noise level threshold.

Aspect 18 may be combined with any of aspects 15 through 17, and includes that computing the bias and gain comprises processing an image weight sum, a gain sum and a bias sum to accumulate a weighted average for the bias and gain.

Aspect 19 may be combined with any of aspects 15 through 18, and includes that combining the gain correction value and bias correction value with the current image comprises combining the gain correction value and bias correction value with the current image using floating-point numbers representing color values and pixel intensities.

Aspect 20 may be combined with any of aspects 15 through 19, and includes saturating the result of combining the gain correction values and bias correction values with the current image prior to generating the corrected image.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-5 may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in tangibly-embodied software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for dynamic fixed pattern correction for an image sensor, comprising:
   storing a current image and a previous image received in the image sensor;
   computing a bias and gain for the current image, wherein the computing comprises processing the current image together with a current local average value, the previous image, and a previous local average value;
   generating a gain correction value and a bias correction value based on the computing;
   combining the gain correction value and bias correction value with the current image to generate a corrected image; and
   generating a Bayer image, based on the generated corrected image.

2. The method of claim 1, wherein computing the bias and gain comprises computing and applying a weighted value using a squared difference between the current local average value and the previous local average value.

3. The method of claim 2, wherein the weighted value comprises at least one of a decay rate and a noise level threshold.

4. The method of claim 1, wherein computing the bias and gain comprises processing an image weight sum, a gain sum and a bias sum to accumulate a weighted average for the bias and gain.

5. The method of claim 1, wherein combining the gain correction value and bias correction value with the current image comprises combining the gain correction value and bias correction value with the current image using floating-point numbers representing color values and pixel intensities.

6. The method of claim 1, further comprising saturating the result of combining the gain correction values and bias correction values with the current image prior to generating the corrected image.

7. The method of claim 1, wherein the image sensor comprises a vehicle image sensor.

8. An image processing system for dynamic fixed pattern correction, comprising:
   an image sensor;
   a memory for storing a current image and a previous image received in the image sensor;
   a processing apparatus, operatively coupled to the memory and the image sensor, wherein the processing apparatus is configured to
      compute a bias and gain for the current image, wherein the computing comprises processing the current image together with a current local average value, the previous image, and a previous local average value,
      generate a gain correction value and a bias correction value based on the computing,
      combine the gain correction value and bias correction value with the current image to generate a corrected image, and
      generate a Bayer image, based on the generated corrected image.

9. The image processing system of claim 8, wherein the processing apparatus is configured to compute the bias and gain by computing and applying a weighted value using a squared difference between the current local average value and the previous local average value.

10. The image processing system of claim 9, wherein the weighted value comprises at least one of a decay rate and a noise level threshold.

11. The image processing system of claim 8, wherein the processing apparatus is configured to compute the bias and gain by processing an image weight sum, a gain sum and a bias sum to accumulate a weighted average for the bias and gain.

12. The image processing system of claim 8, wherein the processing apparatus is configured to combine the gain correction value and bias correction value with the current image by combining the gain correction value and bias correction value with the current image using floating-point numbers representing color values and pixel intensities.

13. The image processing system of claim 8, wherein the processing apparatus is further configured to saturate the result of combining the gain correction values and bias correction values with the current image prior to generating the corrected image.

14. The image processing system of claim 8, wherein the image sensor comprises a vehicle image sensor.

15. A method for dynamic fixed pattern correction for a vehicle image sensor, comprising:

storing a current image and a previous image received in the vehicle image sensor;

computing a bias and gain for the current image, wherein the computing comprises processing the current image together with a current local average value, the previous image, and a previous local average value;

generating a gain correction value and a bias correction value based on the computing;

combining the gain correction value and bias correction value with the current image to generate a corrected image; and generating a Bayer image, based on the generated corrected image.

16. The method of claim 15, wherein computing the bias and gain comprises computing and applying a weighted value using a squared difference between the current local average value and the previous local average value.

17. The method of claim 16, wherein the weighted value comprises at least one of a decay rate and a noise level threshold.

18. The method of claim 15, wherein computing the bias and gain comprises processing an image weight sum, a gain sum and a bias sum to accumulate a weighted average for the bias and gain.

19. The method of claim 15, wherein combining the gain correction value and bias correction value with the current image comprises combining the gain correction value and bias correction value with the current image using floating-point numbers representing color values and pixel intensities.

20. The method of claim 15, further comprising saturating the result of combining the gain correction values and bias correction values with the current image prior to generating the corrected image.

* * * * *